July 15, 1930. L. McDOW 1,770,707
STRAW SPREADER
Filed May 25, 1927 3 Sheets-Sheet 1
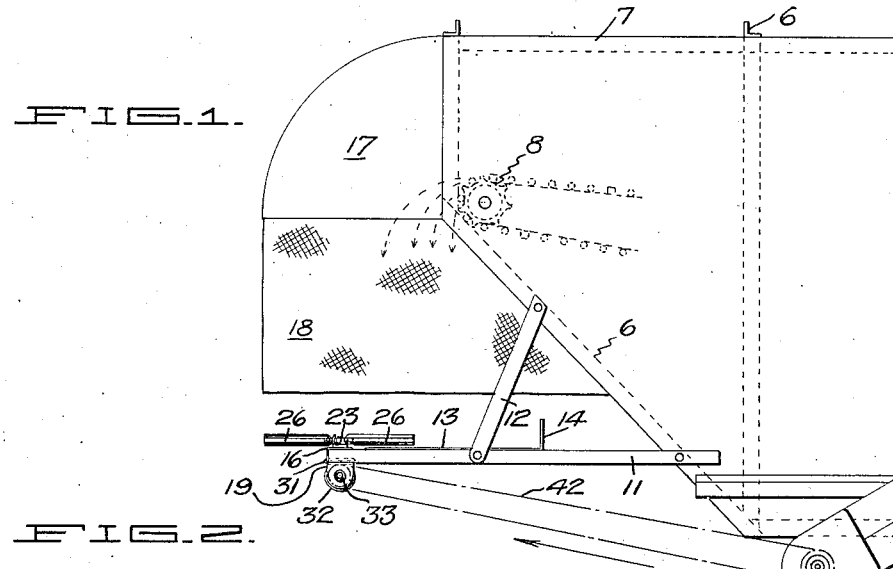
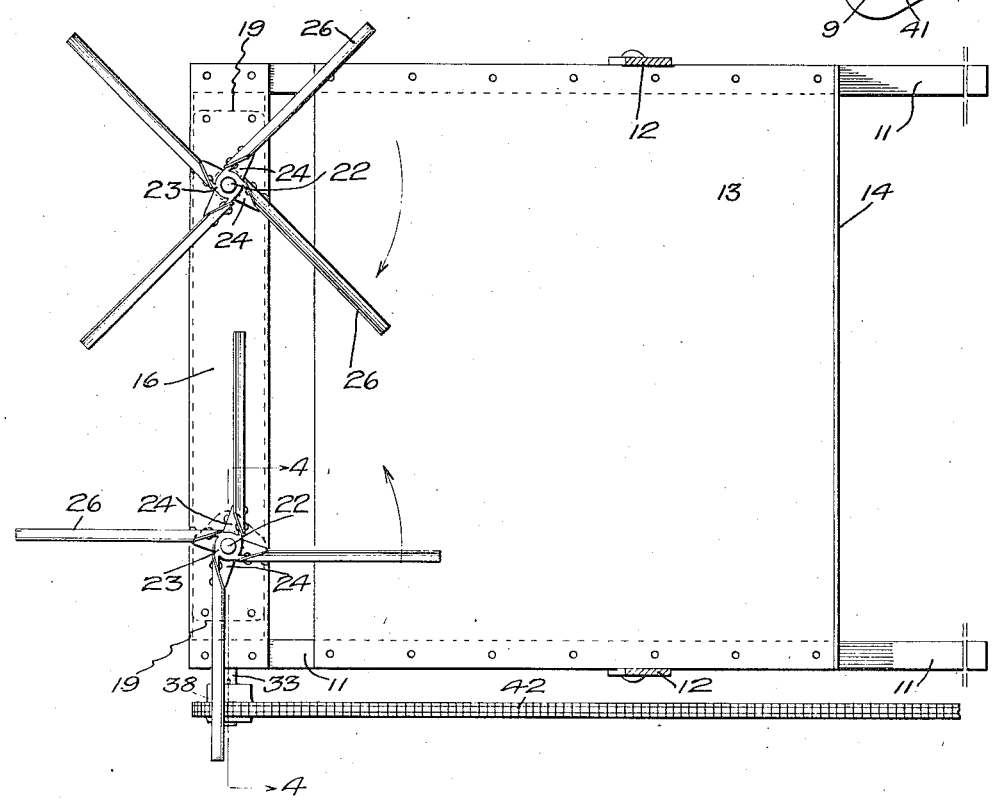
INVENTOR:
Lester McDow
BY
White Prost & Fryer
ATTORNEYS.

July 15, 1930.  L. McDOW  1,770,707
STRAW SPREADER
Filed May 25, 1927   3 Sheets-Sheet 2
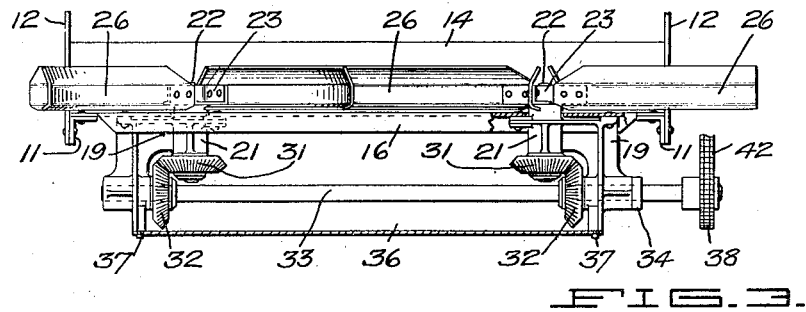
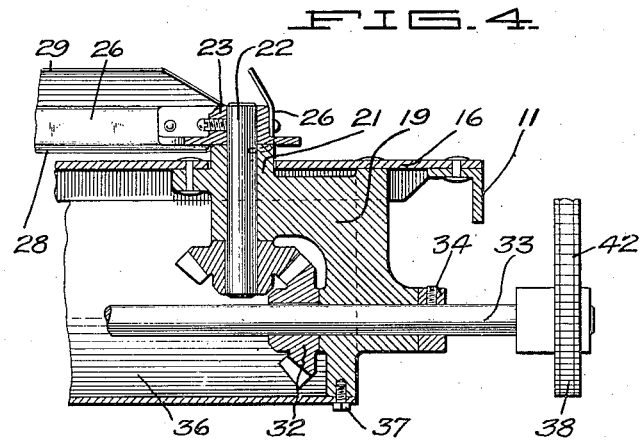
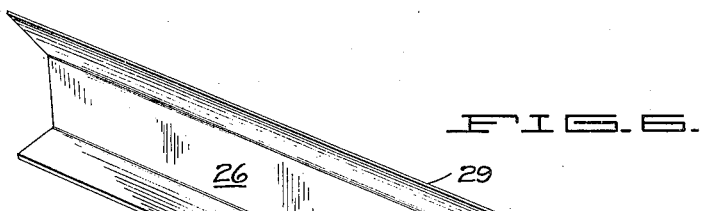
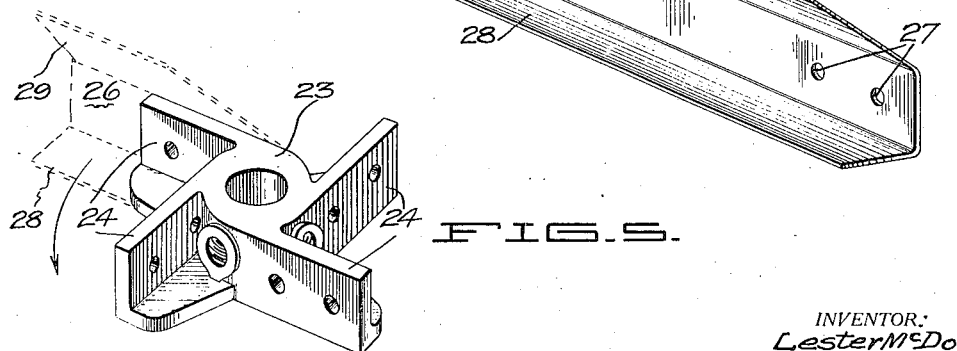
INVENTOR:
Lester McDow
BY White, Prost & Fryer
ATTORNEYS.

July 15, 1930.  L. McDOW  1,770,707
STRAW SPREADER
Filed May 25, 1927   3 Sheets-Sheet 3
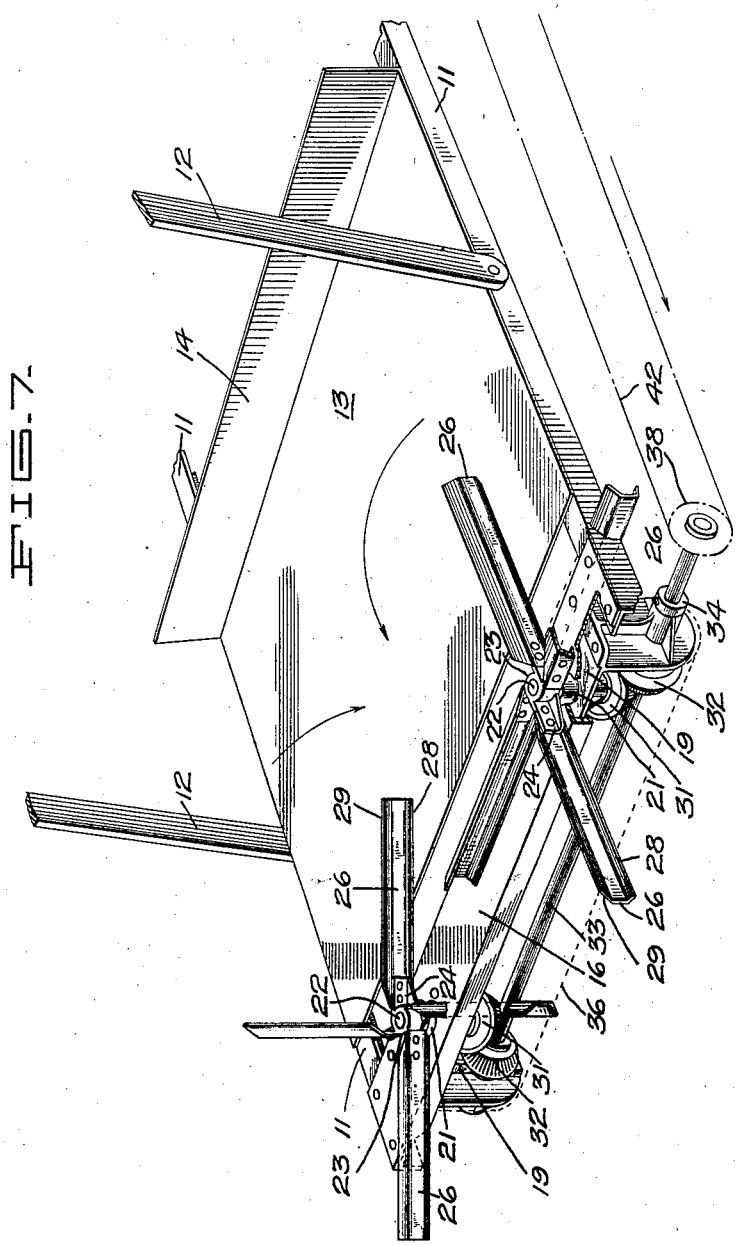
INVENTOR:
Lester McDow
BY
White, Prost & Fryer
ATTORNEYS.

Patented July 15, 1930

1,770,707

UNITED STATES PATENT OFFICE

LESTER McDOW, OF STOCKTON, CALIFORNIA, ASSIGNOR, BY MESNE ASSIGNMENTS, TO CATERPILLAR TRACTOR CO., OF SAN LEANDRO, CALIFORNIA, A CORPORATION OF CALIFORNIA

STRAW SPREADER

Application filed May 25, 1927. Serial No. 194,065.

My invention relates to devices for distributing straw on a field, and is especially adapted to be used in connection with traveling threshing machines for distributing or spreading the threshed straw as the thresher or harvester passes over the field. In some straw spreaders now in use, revolving shafts and gears are used which are exposed, and the straw tends to become wound about them clogging them and hampering the operation of the machine.

It is therefore an object of my invention to provide a straw spreader in which the straw cannot clog the parts or hamper the operation of the machine.

Another object of my invention is to provide a straw spreader which gives a wide, even distribution of the straw.

A further object of my invention is to provide a straw spreader which is particularly adaptable to a harvester and can be driven by the mechanism of the harvester.

My invention possesses other advantageous features, some of which with the foregoing will be set forth at length in the following description where I shall outline in full that form of the straw spreader of my invention, which I have selected for illustration in the drawings accompanying and forming part of the present specification. In said drawings I have shown one form of straw spreader embodying my invention, but it is to be understood that I do not limit myself to such form since the invention, as set forth in the claims, may be embodied in a plurality of forms.

In the drawings:

Fig. 1 is a side elevation of a portion of a harvesting machine with the straw spreader of my invention attached thereto.

Fig. 2 is a plan view of the straw spreader.

Fig. 3 is an end elevation showing particularly the driving means for the straw spreader.
Fig. 4 is a cross section on the line 4—4 of Fig. 2.

Fig. 5 shows in perspective the hub on which the impeller blades are mounted.

Fig. 6 shows in perspective one of the impeller blades.

Fig. 7 discloses the straw spreader of my invention in perspective.

The straw spreader of my invention preferably comprises a plurality of rotating hubs each provided with a plurality of blades, the blades preferably being arranged to sweep thru a space common to the path of at least two of them and being shaped to provide an air current which deters the passage of straw thru the path of the blades.

While the straw spreader of my invention is in most cases advantageously utilized in conjunction with a harvester, and particularly with the separator portion of a combined harvester, it is not limited to such an installation and can be utilized whenever it is desired to spread straw. For convenience in illustration and description, I have, however, disclosed it as attached to the separator portion of a combined harvester. The harvester comprises, as shown in Fig. 1, a framework 6 of the usual type covered with suitable sheathing 7 and provided with a mechanism 8 for discharging the threshed straw. Suitable means, not shown, are provided for driving the discharge mechanism 8, and also for driving other portions of the threshing machinery thru the medium of the shaft 9.

To the framework 6 of the separator, a pair of parallel beams 11 is secured and is braced by struts 12 secured to the beams and also to the framework 6. Supported on the beams 11 is a platform 13 preferably made of a sheet of metal, the forward end of which is preferably flanged to provide an upstanding wall 14 acting as a baffle. The rearward ends of the two beams 11 are united by an angle 16 preferably riveted or bolted in place. The angle forms a brace for the rear of the beams and together with the sheet 13 provides a firm and rigid platform projecting to the rear of the separator.

The straw is preferably discharged onto the rear of the platform, and to direct the straw and to nullify the effect of wind, I provide a hood 17 which is a substantially constructed housing secured to the framework 6 of the separator. The hood is provided with a depending apron 18 of fabric or comparable material attached to the hood 17 and also to 1 the framework 6. The apron extends to within a short distance of the platform and aids in directing the straw to fall thereon.

On the platform, distributing or spreading means are provided. At each end of the angle 16, a journal base 19 is secured which is preferably a casting of irregular shape to conform with the contour of the angle and to provide a vertical journal 21. Within each of the vertical journals 21, a stub shaft 22 is mounted and carries at its upper end a hub 23. The hub is disclosed particularly in Fig. 5 and is shown as comprising a plurality of tangential arms 24 of flanged construction for solidity and apertured to carry impeller blades 26. Threshed straw which is discharged from the mechanism 8 and passes thru the hood 17 toward the platform, is directed by the revolving impellers to discharge from the machine in a tangential direction and spread over the field.

To prevent straw passing thru the path of the blades 26 and to prevent it becoming wound about the shafts 22 or the hubs 23, the blades are given a peculiar cross sectional contour. As shown in Fig. 6, each blade preferably comprises an upright portion having apertures 27 therein for cooperation with fastening means to secure the blades to the hubs 23. Below the apertures 27 and preferably formed of the same material as the upright portion is a substantially horizontal flange 28. The flange extends in the direction of motion of the blade and together with an inclined upper flange 29, also formed integrally with the upright portion, provides a channel shaped impeller blade. This particular shape of the blade is advantageous in setting up a current of air adjacent the rapidly rotating impellers which prevents the straw from dropping into direct contact with the blades and consequently prevents it from becoming entangled with the rotating parts. In practice, the straw descending toward the impellers is thrown off by the current of air as it reaches a region a slight distance above the blades. A veritable fog of straw is produced and the air currents not only afford an even distribution of the straw but they also assist in keeping the revolving parts free from entangled straw.

The uniform spreading of the straw is further enhanced by the length of the impeller blades and the location of the two shafts 22. These proportions are such that the blades on each of the hubs 23 sweep thru a portion of space which is coincident to the path of the other set of blades. Straw which falls adjacent the central portion of the platform is therefore afforded a considerable velocity which tends to distribute it or spread it evenly over the field.

Means are provided for driving the impellers and also for rotating them synchronously in such a manner that the impeller blades 26 are non-interfering. Each shaft 22 at its lower end carries a bevel gear 31 meshing with a comparable gear 32 secured to a drive shaft 33 passing horizontally and transversely of the platform. The drive shaft 33 is conveniently journaled in extensions of the bases 19 and is secured against axial movement by collars 34. The bevel gears 31 and 32 as well as the drive shaft 33 are protected against dirt and dust by a closure 36 passing around them and secured to the bases 19 by suitable studs 37. The closure also serves as a central housing for lubricant for the gears and journals. At one end the projecting drive shaft 33 carries a sprocket 38 in alinement with a sprocket 41 mounted on shaft 9 and is driven in conjunction therewith by a chain 42. As the shaft 9 is driven by the source of power on the harvester, the sprocket 41 thru the chain 42 will revolve the driven shaft 33 and correspondingly rotate the impeller blades 26. The mesh of the bevel gears 31 and 32 is such that the blades occupy the relationship particularly shown in Fig. 2 and they are therefore non-interfering.

I claim:

1. A straw spreader comprising a platform, a hood over said platform through which straw is discharged, a rotatable hub on said platform, and horizontal channel blades on said hub, said blades being tangentially connected to the hub and adapted to create a current of air to deter the passage of straw through the path of said rotating blades.

2. A straw spreader comprising a platform, a pair of hubs on said platform, impeller blades on said hubs, said blades having a channel formation with upper inclined flanges, means for driving said hubs to revolve said impeller blades, and a hood over said platform through which straw is discharged, the arrangement being such that substantially all of the straw is discharged in the space between the top of the impeller blades and the hood.

3. A straw spreader comprising a horizontal platform, a pair of hubs vertically journaled at one end of said platform, a drive shaft for rotating said hubs in unison, a hood above said platform through which straw is discharged, and channel blades on said hubs, said blades having inclined upper flanges adapted to discharge said straw substantially tangentially and to deter the passage of straw through the path of said blades.

4. A straw spreader comprising a platform, a pair of journal bases secured to said platform and depending therefrom, a shaft journaled in the depending portions of said bases, stub shafts journaled in each of said bases and extending thru said platform, gears connecting said shafts, and a removable closure for completing the compartment partially bounded by said platform and the depending portions of said bases.

5. In a straw spreader including a downwardly directed hood through which straw is discharged, an impeller arranged transversely of the path of discharge from the hood, said impeller comprising a hub and a plurality of blades of channel formation tangentially connected with the hub, whereby rotation of the impeller creates a current of air to discharge straw tangentially and to deter passage of straw through the path of the rotating blades.

In testimony whereof, I have hereunto set my hand.

LESTER McDOW.